United States Patent
Liu et al.

(10) Patent No.: US 10,090,793 B2
(45) Date of Patent: Oct. 2, 2018

(54) ELECTRIC MOTOR, COMPRESSOR, AND METHOD FOR CONTROLLING ELECTRIC MOTOR OR COMPRESSOR

(71) Applicant: Danfoss (Tianjin) Ltd., Tianjin (CN)

(72) Inventors: Wanzhen Liu, Tianjin (CN); Li Yao, Tianjin (CN); Yan Lin, Tianjin (CN); Zhenyu Wang, Tianjin (CN)

(73) Assignee: Danfoss (Tianjin) Ltd., Tianjin (CN)

( * ) Notice: Subject to any disclaimer, the term of this patent is extended or adjusted under 35 U.S.C. 154(b) by 339 days.

(21) Appl. No.: 14/580,979

(22) Filed: Dec. 23, 2014

(65) Prior Publication Data
US 2015/0188480 A1    Jul. 2, 2015

(30) Foreign Application Priority Data
Dec. 30, 2013 (CN) .......................... 2013 1 0743080

(51) Int. Cl.
*G10C 3/12* (2006.01)
*H02P 29/00* (2016.01)
(Continued)

(52) U.S. Cl.
CPC ............ *H02P 29/005* (2013.01); *F04D 25/06* (2013.01); *F04D 25/0606* (2013.01);
(Continued)

(58) Field of Classification Search
CPC .... H02K 1/2793; H02K 2201/06; H02P 6/26; H02P 29/662; H02P 2207/05
See application file for complete search history.

(56) References Cited

U.S. PATENT DOCUMENTS 5,659,217 A * 8/1997 Petersen ................ H02K 1/146
                                                  310/156.26
5,780,953 A * 7/1998 Umeda ................. H02J 7/1492
                                                  310/263
(Continued)

FOREIGN PATENT DOCUMENTS

CN         1315777 A      10/2001
CN       201126959 Y      10/2008
(Continued)

*Primary Examiner* — Marlon Fletcher
(74) *Attorney, Agent, or Firm* — McCormick, Paulding & Huber LLP (57) ABSTRACT

An electric motor, a compressor including the electric motor and a method for controlling the electric motor or the compressor are provided. The electric motor includes: a stator; single-phase or multiphase windings disposed on the stator; and a rotor, where the rotor includes a permanent magnet, and at least part of the permanent magnet is ferrite. By using a permanent magnet synchronous motor in a variable-speed compressor, costs of the variable-speed compressor are significantly reduced, and the performance thereof is basically the same as that of a variable-speed compressor using a rare-earth permanent magnet synchronous motor. By controlling the electric motor or the compressor, costs of the electric motor or the compressor are reduced, and moreover, and the ferrite in the electric motor can be protected from irreversible demagnetization at a low temperature, thereby improving the reliability of the compressor.

22 Claims, 7 Drawing Sheets

(51) Int. Cl.
*F04D 25/06* (2006.01)
*H02H 7/08* (2006.01)
*H02K 1/27* (2006.01)
*H02K 11/00* (2016.01)
*H02K 15/12* (2006.01)
*H02H 7/085* (2006.01)
*H02P 29/62* (2016.01)

(52) U.S. Cl.
CPC ........ *H02H 7/0844* (2013.01); *H02H 7/0851* (2013.01); *H02K 1/27* (2013.01); *H02K 1/2766* (2013.01); *H02K 11/0094* (2013.01); *H02K 15/125* (2013.01); *H02P 29/62* (2016.02); *H02K 2213/03* (2013.01)

(56) References Cited

U.S. PATENT DOCUMENTS

| | | | | |
|---|---|---|---|---|
| 5,990,590 | A * | 11/1999 | Roesel, Jr. | F02N 11/04 310/112 |
| 6,037,692 | A * | 3/2000 | Miekka | B60L 11/1807 310/181 |
| 6,508,636 | B2 | 1/2003 | Ogawa et al. | |
| 7,659,680 | B1* | 2/2010 | McVickers | B60T 1/10 310/179 |
| 7,843,101 | B2* | 11/2010 | Ito | H02K 1/2766 310/156.46 |
| 9,698,660 | B2* | 7/2017 | Reddy | H02K 21/12 |
| 2001/0026764 | A1 | 10/2001 | Ogawa et al. | |
| 2004/0245879 | A1* | 12/2004 | Hirzel | H02K 21/24 310/156.01 |
| 2008/0136272 | A1* | 6/2008 | Ishikawa | H02K 1/145 310/58 |
| 2013/0026873 | A1* | 1/2013 | Stretz | H02K 1/276 310/156.16 |
| 2013/0334922 | A1* | 12/2013 | Park, II | H02K 1/2733 310/156.09 |
| 2014/0103768 | A1* | 4/2014 | Brahmavar | H02K 21/16 310/156.08 |
| 2014/0103772 | A1* | 4/2014 | Kingrey | H02K 15/03 310/156.15 |
| 2014/0265673 | A1* | 9/2014 | Kreidler | H02K 3/522 310/71 |
| 2014/0265686 | A1* | 9/2014 | Blaetner | F16C 35/067 310/90 |
| 2015/0303750 | A1* | 10/2015 | Bouarroudj | H02K 21/16 417/410.5 |
| 2016/0065112 | A1* | 3/2016 | Reddy | H02P 29/662 318/473 |
| 2016/0118923 | A1* | 4/2016 | Kano | H02P 25/22 318/400.02 |
| 2017/0244353 | A1* | 8/2017 | Reddy | H02P 29/60 |

FOREIGN PATENT DOCUMENTS

| | | |
|---|---|---|
| CN | 103124064 A | 5/2013 |
| CN | 103238267 A | 8/2013 |
| JP | 2005-45877 A | 2/2005 |

* cited by examiner

FIG. 7

ELECTRIC MOTOR, COMPRESSOR, AND METHOD FOR CONTROLLING ELECTRIC MOTOR OR COMPRESSOR

CROSS REFERENCE TO RELATED APPLICATIONS

Applicant hereby claims foreign priority benefits under U.S.C. § 119 from Chinese Patent Application Serial No. CN201310743080.5 filed on Dec. 30, 2013, the contents of which are incorporated by reference herein.

FIELD OF THE INVENTION

The present invention relates to the field of electric motor technologies, and in particular, to an electric motor, a compressor, and a method for controlling the electric motor or compressor.

BACKGROUND OF THE INVENTION

Most current electric motors are rare-earth permanent magnet synchronous motors. Costs of such electric motors are greatly affected by prices of rare earths. As a result, the electric motors have high costs and unstable prices. If the electric motor is applied in a compressor such as a frequency-variable compressor, the compressor also has high costs and an unstable price.

SUMMARY

Embodiments of the present invention provide an electric motor and a compressor having the electric motor. The electric motor is a ferrite motor, such as a permanent magnet synchronous motor, so that costs of the electric motor are significantly reduced. A compressor using this electric motor has the same performance as a conventional compressor (such a compressor using a rare-earth permanent magnet motor), but has lower costs than the compressor using the rare-earth permanent magnet motor.

Embodiments of the present invention also provide a method for controlling an electric motor or a compressor. When the compressor is started and is running, a heating element is configured to heat a ferrite magnet of a rotor in the electric motor, so as to prevent the ferrite magnet from being demagnetized irreversibly.

According to an embodiment of the present invention, an electric motor provided. The electric motor includes: a stator; single-phase or multiphase windings disposed on the stator; and a rotor, where the rotor includes a permanent magnet, and at least part of the permanent magnet is ferrite.

According to an aspect of the present invention, the electric motor further includes: a heating element disposed on a surface of or near the ferrite magnet of the rotor and used for heating the ferrite magnet.

According to another embodiment of the present invention, a compressor is provided. The compressor includes:
  a shell;
  a high-pressure chamber and a low-pressure chamber within the shell; and
  the above-mentioned electric motor disposed in the low-pressure chamber.

According to an embodiment of the present invention, a method for controlling the compressor is provided. The method includes:
  acquiring a temperature of an electric motor in the compressor;
  searching for a maximum allowable working current of the electric motor corresponding to the temperature of the electric motor based on a relationship table between maximum allowable working currents and temperatures of the electric motor; and
  controlling the compressor according to the maximum allowable working current of the electric motor.

According to the technical solution of the present invention, ferrite is used in the electric motor, so that costs of the electric motor can be reduced. In addition, a permanent magnet synchronous motor is used in a compressor such as a variable-speed compressor, and in this way, costs of the variable-speed compressor are significantly reduced, and the performance thereof is basically the same as that of a compressor using a rare-earth permanent magnet synchronous motor. In an embodiment, a heating element may be used to heat the ferrite in the electric motor, thereby preventing the ferrite from being demagnetized. In another embodiment, by controlling an input current of the electric motor or the compressor, the ferrite in the electric motor can be protected from irreversible demagnetization at a low temperature, thereby improving the reliability of the compressor.

DETAILED DESCRIPTION

Figure 2:
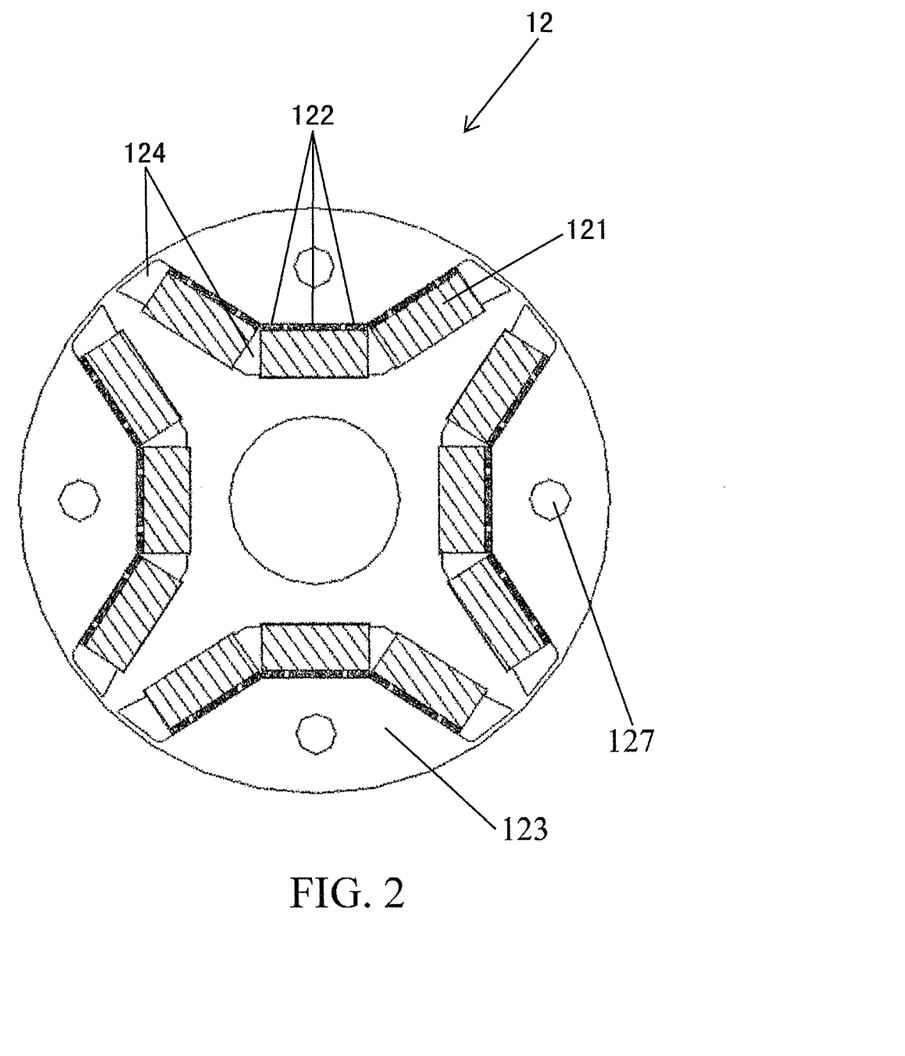
FIG. 2 is a schematic diagram of a rotor of an electric motor according to another embodiment of the present invention.
Figure 3:
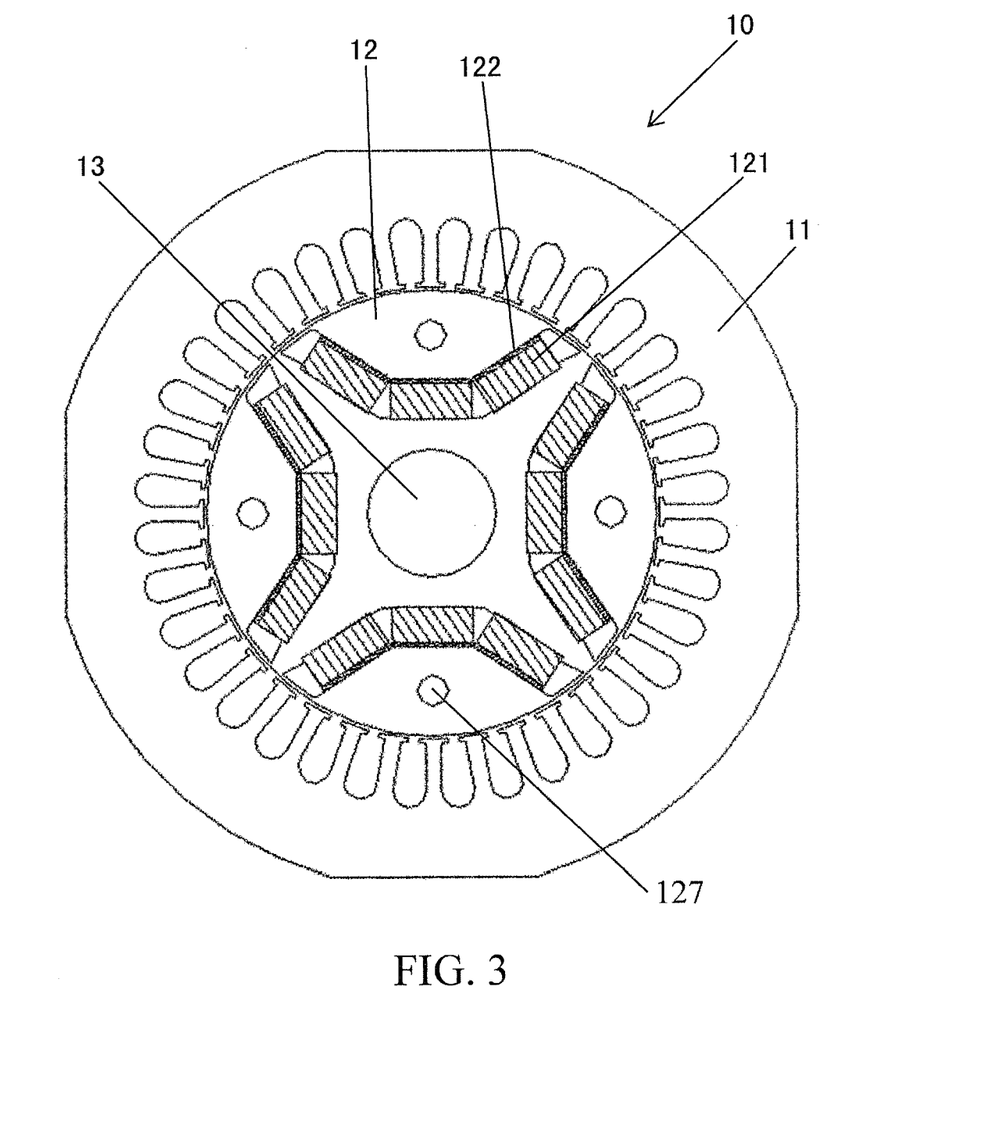
FIG. 3 is a schematic diagram of an electric motor according to an embodiment of the present invention.
Figure 4:
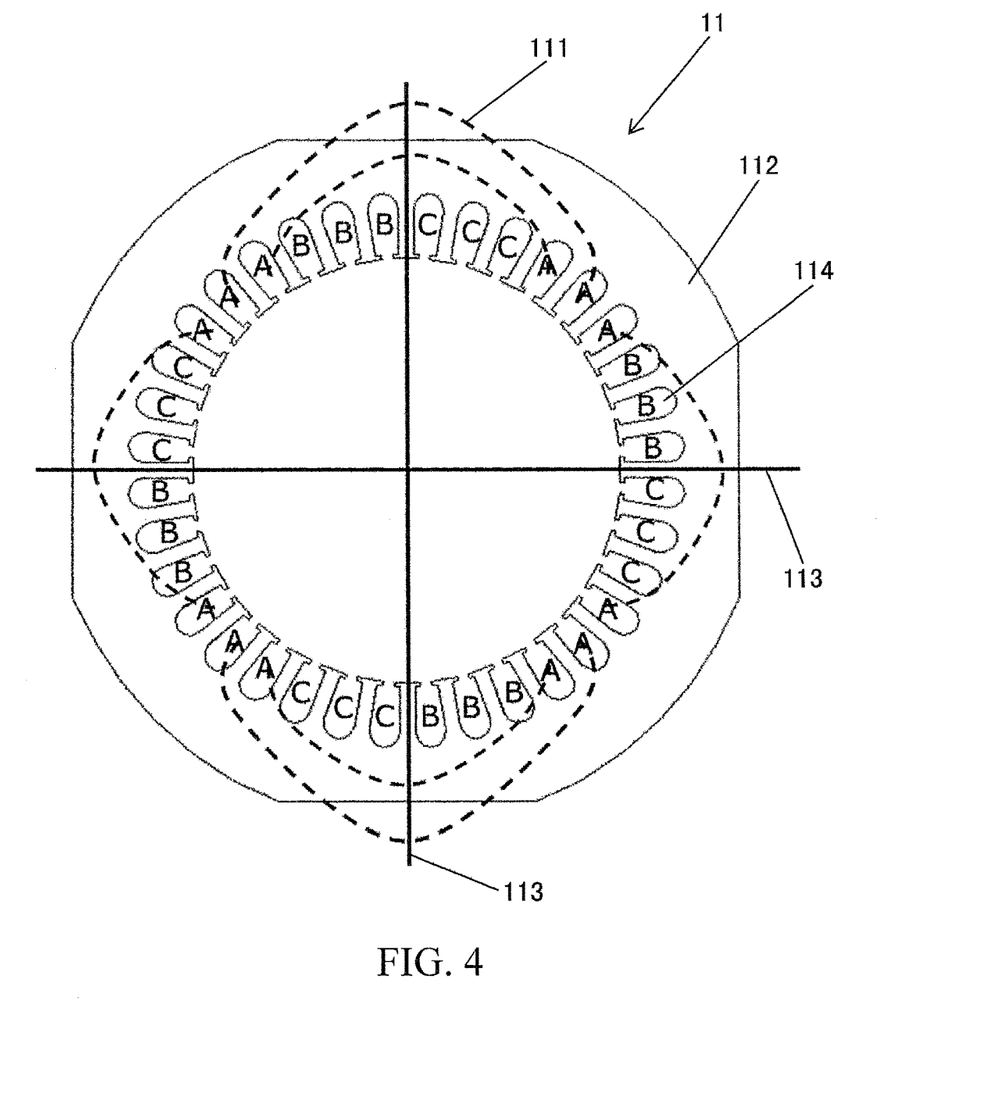
FIG. 4 is a schematic diagram of a stator of an electric motor according to an embodiment of the present invention.
Figure 6:
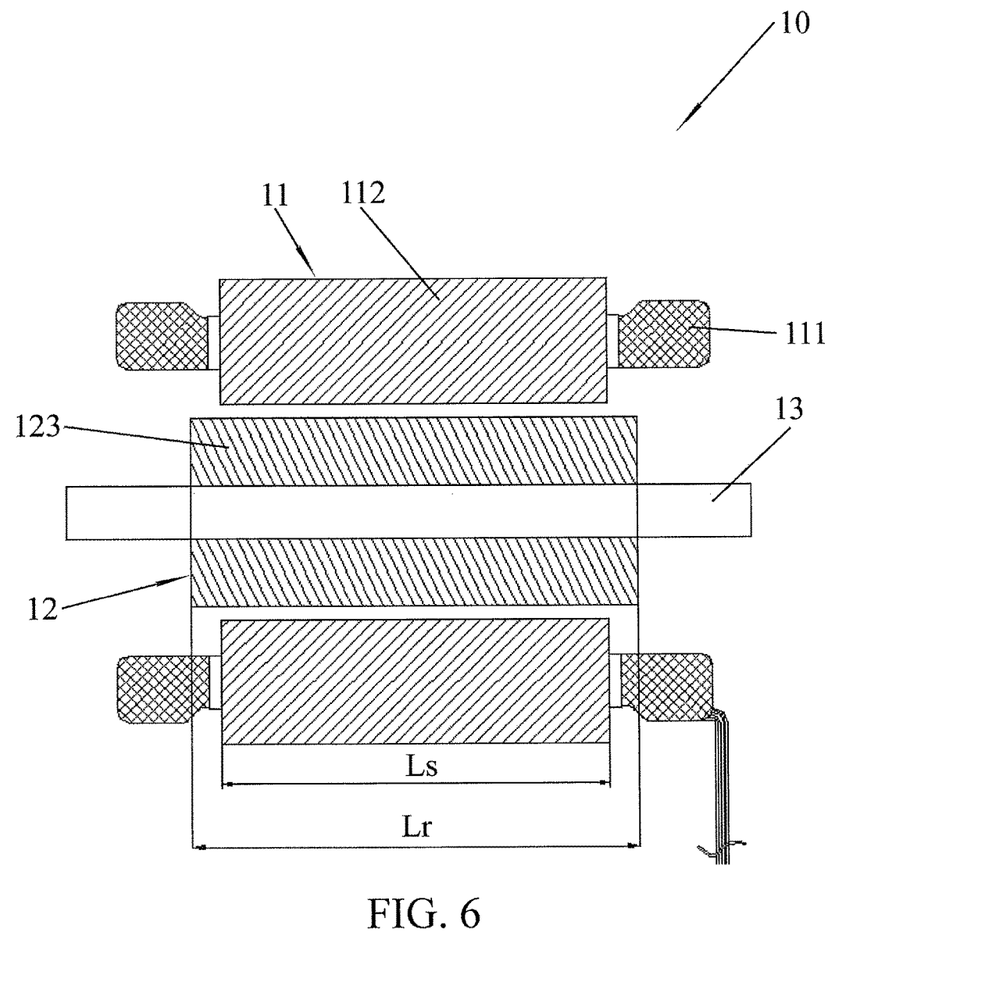
FIG. 6 is an axial sectional schematic diagram of an electric motor according to an embodiment of the present invention.

Referring to FIG. 1 to FIG. 4 and FIG. 6, a compressor according to an embodiment of the present invention includes a shell that includes a high-pressure chamber and a low-pressure chamber; and an electric motor 10 disposed in the low-pressure chamber. The electric motor 10 includes a rotor 12, a stator 11, and a rotating shaft 13. The rotor 12 has a rotor core 123 made up of rotor laminations, permanent magnet slots 124 formed in the rotor core 123, and permanent magnets 121 disposed in the permanent magnet slots 124. The rotor laminations may be fixed together by using rivets that pass through rivet holes 127. At least some of the permanent magnets 121 are made of ferrite material. For example, all the permanent magnets 121 may be made of ferrite material. The rotor 12 has rotor magnetic axes 125. The stator 11 includes a stator core 112 made up of stator laminations, stator slots 114 formed in the stator core 112, and windings, such as phase-A windings, phase-B windings, and phase-C windings, disposed in the stator slots 114. The stator 11 further includes multiple stator teeth that extend inward along a radial direction of the stator, and the stator slots 114 are distributed between the stator teeth. The windings are wound on the stator teeth so as to generate a rotating magnetic field. In the case of three-phase windings, phases of the three-phase windings have a difference of 120 electrical degrees with each other. FIG. 4 and FIG. 6 show phase-A windings 111 and axes 113 of the phase-A windings 111. The windings of the electric motor may also be single-phase windings or other multiphase windings. For example, the rotor is rotatably disposed in the stator and is at a distance from the stator, permanent magnets are distributed on the rotor to form rotor poles, and at least some of the permanent magnets are ferrite magnets.

Figure 1:
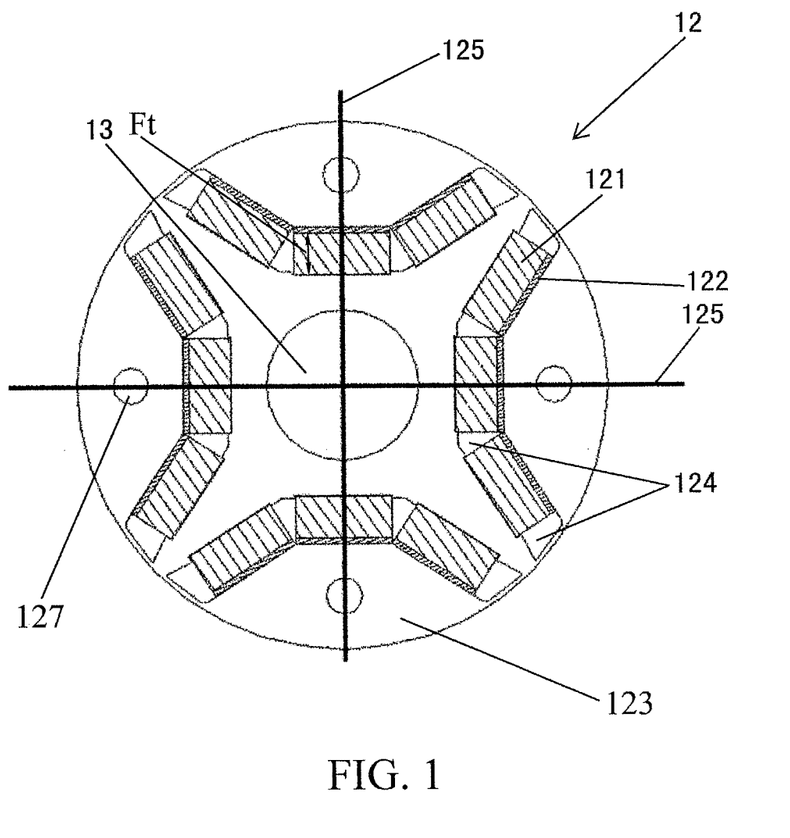
FIG. 1 is a schematic diagram of a rotor of an electric motor according to an embodiment of the present invention.

As shown in FIG. 1, the ferrite magnet may be basically sheet-shaped. Moreover, if the ferrite magnet is excessively thin, it is easily demagnetized. Therefore, according to an embodiment of the present invention, average thickness Ft of the ferrite magnet may be greater than or equal to 4 mm and less than or equal to 6 mm. For example, the average thickness Ft may be 5 mm to 10 mm (for example, 6 mm), so as to improve flux and a demagnetization resisting capability.

As shown in FIG. 6, in an axial direction of the rotor 12, the rotor core 123 formed by rotor laminations in the electric motor such as a permanent magnet synchronous motor may have a same length as the corresponding stator core 112 formed by stator laminations, or the rotor core 123 formed by the rotor laminations may be longer than the stator core 112 formed by the stator laminations. For example, in the axial direction of the rotor 12, the rotor core 123 formed by the rotor laminations is 6 mm to 16 mm longer than the stator core 112 formed by the stator laminations.

The compressor using the electric motor may be any suitable compressor, for example, a compressor used for a refrigerating system, such as a variable-speed compressor or a variable-speed scroll compressor. The electric motor may be any electric motor running in a low-temperature environment, for example, a permanent magnet synchronous motor, a built-in permanent magnet motor, or any other suitable electric motor running in a low-pressure chamber of a compressor. The lowest temperature of the environment where the electric motor is located can be −40° C. The windings of the stator of the permanent magnet synchronous motor may be centralized windings or distributed windings. The material of the windings may be copper or other electric conductive materials such as aluminum. The rotor of the permanent magnet synchronous motor may be a surface rotor or a built-in rotor. The coercivity (at a temperature of 20° C.) in the ferrite magnet may be greater than or equal to 300 kA/m. A working voltage of the variable-speed compressor may be a medium or low voltage less than 640V.

For an application of an electric motor such as a permanent magnet synchronous motor in a low-pressure chamber of a variable-speed compressor, a drive of the variable-speed compressor may have a function of controlling a maximum allowable working current of the compressor at a low temperature, so as to prevent the ferrite magnet in the electric motor of the compressor from irreversible demagnetization.

The drive sets the maximum allowable working current of the electric motor 10 according to a temperature of the rotor 12 of the electric motor 10 and a relationship table between maximum allowable working currents and temperatures of the electric motor, so as to prevent the ferrite magnet from being demagnetized irreversibly. At least one temperature measuring device may be disposed in the low-pressure chamber of the variable-speed compressor, so as to detect a temperature of the low-pressure chamber of the compressor or a temperature of the stator/rotor of the electric motor in the low-pressure chamber of the compressor. The drive of the variable-speed compressor adjusts (e.g., increases or decreases) the maximum allowable working current based on the temperature detected by the temperature measuring device, or controls whether o give an alarm based on the temperature, or controls whether to perform power-off protection for the compressor based on the temperature. The temperature of the rotor 12 of the electric motor 10 may be determined by using a temperature sensor in the low-pressure chamber, a temperature sensor on the electric motor, or a temperature sensor on the rotor. In other words, the temperature in the low-pressure chamber or the temperature of the electric motor may be used as the temperature of the rotor.

A relationship table between maximum allowable working currents and temperatures may be created, and the relationship table between maximum allowable working currents and temperatures may be obtained by means of a magnetic circuit method or magnetic field analysis/finite element analysis. In the magnetic circuit method, a magnetic circuit model corresponding to the electric motor of the compressor may be established, a relationship between maximum allowable working currents and knees of a demagnetization curve of the ferrite magnet is derived, and then, according to a relationship between knees of the demagnetization curve of the ferrite magnet and temperatures, a relationship table between maximum allowable working currents and temperatures can be obtained. In the magnetic field analysis/finite element analysis, magnetic field analysis software is used to establish a electric motor model corresponding to the compressor, and an (irreversible) demagnetization analysis is performed on the ferrite magnet in the electric motor by changing a current in the windings of the electric motor winding at a given temperature, thereby a maximum allowable working current at the given temperature is obtained. In the same manner, the relationship table between maximum allowable working currents and temperatures can be obtained by changing the given temperature.

According to the temperature of the rotor, the drive drives the electric motor to run (for example, the drive starts the electric motor or keeps the electric motor running) when a working current of the electric motor is lower than a specified threshold (for example, 80%, 85%, or 90% of the maximum allowable working current or a value between 80% and 90% of the maximum allowable working current); when the working current of the electric motor is greater than the specified threshold and lower than the maximum allowable working current, the drive generates an alarm but still keeps the electric motor running normally (for example, the drive starts the electric motor or keeps the electric motor running); when the working current of the electric motor is greater than the maximum allowable working current, the drive stops the electric motor in the compressor, for example, the drive turns off a power supply of the compressor.

As shown in FIG. 1 to FIG. 3, the electric motor 10 further includes a heating element 122 disposed on a surface of or close to the ferrite magnet of the rotor 12 and used for heating the ferrite magnet. Specifically, the heating element 122 is disposed close to the permanent magnet 121 formed by the ferrite material in the rotor 12 (for example, above, below, or on two sides of the permanent magnet 121 formed by the ferrite material) or disposed on the surface of the permanent magnet 121 formed by the ferrite material in the rotor 12. As shown in FIG. 1, one heating element 122 may be disposed on one permanent magnet 121, or as shown in FIG. 2, multiple heating elements 122, for example, 2, 3, 4, 5, 6 or more heating elements 122, may be disposed on one permanent magnet 121. The heating element 122 may be plate-shaped. The heating element 122 may be any suitable heating element or heating apparatus, for example, a resistive heater, or a heater that generates heat in a chemical manner.

According to some implementation manners of the present invention, the heating element 122 may be made of an electric conductive material, and in particular, an electric conductive and magnetic iron sheet or a single or multiple silicon steel sheets. Alternatively, the heating element 122 may also be one or more ion blocks. When the electric motor runs at a low temperature, it may be unnecessary to apply a heating current to the heating element 122, such as a pulse current or a sine current, because when the ferrite motor 10 runs in a low-temperature environment, the windings of the stator 11 of the electric motor generate an alternating magnetic field during normal running of the electric motor, and the alternating magnetic field enables the heating element 122 to generate heat as the heating element 122 is an electric conductive material. Thereby, the ferrite magnet can be heated. Compared with the ferrite motor without a heating element, the electric motor with the heating element 122 has a higher temperature at the ferrite magnet, and can run in a larger-torque working condition.

The drive connected to the electric motor may be used to provide a heating current for the windings of the stator so that an eddy current is generated in the heating element 122 and thereby heat is generated by the heating element 122. That is, the windings of the stator of the electric motor generate a magnetic field such as an alternating magnetic field which enables the heating element to generate an eddy current and to generate heat. The heating current may be a pulse current (or a pulse voltage), a sine current, a high-frequency pulse current (or a high-frequency pulse voltage), or a high-frequency sine current, and the eddy current generated in the heating element 122 enables the heating element 122 to generate heat and to heat the ferrite magnet. Specifically, when the ferrite motor is in a low-temperature environment (for example, the temperature is lower than or equal to 20° C.), it is needed to use the heating element 122 to heat the ferrite magnet according to the working condition of the electric motor. The heating current may be any suitable heating current, as long as an eddy current can be generated in the heating element 122.

According to an exemplary implementation manner of the present invention, before the electric motor is started, the drive is used to apply a pulse current to the windings of the stator, so as to generate a pulsating magnetic field which generates an eddy current in the heating element so as to generate heat; and/or, when the electric motor is started or running, the drive applies a pulse current component or a high-frequency sine current component to the windings of the stator (that is, a current applied to the windings of the stator in the electric motor includes a pulse current component or a high-frequency sine current component), in order to generate a pulsating magnetic field or a high-frequency rotating magnetic field which generates an eddy current in the heating element so as to generate heat. Preferably, the pulse current or the pulse current component or the high-frequency sine current component applied to the windings of the stator makes a magnetic axis of the magnetic field generated by the windings of the stator substantially coincide with a magnetic axis of the rotor.

For example, before the electric motor is started at a low temperature, the ferrite motor is in an "off" state in a low-temperature environment. In such a situation, a large start current is generally needed in order to start the electric motor. In this case, before the electric motor is started, it is needed to heat the ferrite magnet of the electric motor by the heating element 122 so as to increase the temperature of the ferrite magnet and to avoid the demagnetization during the start. The drive or an inverter in the drive may be used to generate a pulse current shown in FIG. 5, and the pulse current can then generate an eddy current in the heating element 122 so as to generate heat to heat the ferrite magnet. When the electric motor reaches a given temperature, heating can be stopped and the electric motor or the compressor is started. Specifically, the given temperature may be set in the temperature measuring device of the electric motor or the compressor and then provided for the inverter or the drive, and then the inverter or the drive calculates a maximum allowable working current corresponding to the given temperature with reference to the relationship table between maximum allowable working currents and temperatures. When the electric current is greater than the start current needed, the inverter or the drive stops the heating and starts the electric motor or the compressor. When the electric motor is started, the drive applies a pulse current to the three-phase windings of the stator to enable the heating element 122 to generate heat, and a magnetic axis of the magnetic field generated by the three-phase windings under the effect of the pulse current applied to the three-phase windings of the stator substantially coincides with the magnetic axis 125 of the rotor. Thereby, a slight swing of the rotor of the electric motor during heating can be prevented. Similarly, for an electric motor other than the three-phase electric motor, the pulse current applied to the windings of the stator makes a magnetic axis of the magnetic field generated by the windings substantially coincide with the magnetic axis 125 of the rotor, so as to prevent a slight swing of the rotor of the electric motor during heating.

Figure 5:
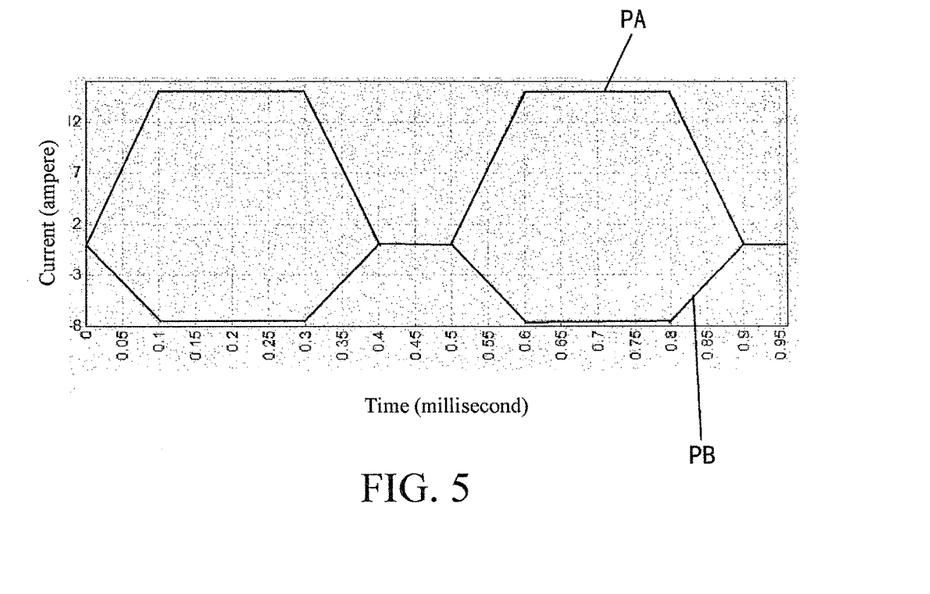
FIG. 5 is a schematic diagram of a pulse current applied to windings of a stator of a three-phase electric motor.

In some situations, due to a large resistance on the rotor, the rotor of the electric motor does not swing even if the pulse current applied to the windings such as three-phase windings of the stator does not make the magnetic axis of the magnetic field generated by the windings such as three-phase windings coincide with the magnetic axis 125 of the rotor. As an example, a pulse current may be applied to the windings of the stator to drive the rotor to rotate, so that the axis of windings at one phase among the three-phase windings substantially coincides with the magnetic axis 125 of the rotor; then, a pulse current is applied to the three-phase windings of the stator, the amplitude of the pulse current applied to the windings at one phase is twice the amplitude of the pulse current applied to windings of the other two phases, and the phase of the pulse current applied to the windings at one phase has a 180-degree phase difference with the phase of the pulse current applied to the windings of the other two phases. For example, as shown in FIG. 5, the amplitude of the pulse current PA applied to the phase-A windings is twice the amplitude of the pulse current PB applied to the phase-B and phase-C windings, and the phase of the pulse current PA applied to the phase-A windings has a 180-degree phase difference with the phase of the pulse current PB applied to the phase-B and phase-C windings. An ideal rotor position corresponding to the pulse currents in FIG. 5 is that: the magnetic axis 125 of the rotor shaft coincides with the axis 113 of the phase-A windings. The amplitude and frequency of the pulse current for heating may be determined according to an actual temperature of the electric motor.

When the ferrite motor 10 runs with a heavy load in a low-temperature environment, a pulse current, a sine current, a high-frequency pulse current or a high-frequency sine current may be added to an output current of the drive or the inverter in the drive so that more eddy currents are generated in the heating element 122, thereby heating the ferrite magnet. Consequently, an operating capacity of the electric motor can be further improved and the electric motor can output a larger torque and can be protected from the demagnetization. The added current may be applied continuously or intermittently. The introduction of the pulse current or sine current may increase a torque fluctuation, and if the increased torque fluctuation is greater than a corresponding standard for the electric motor, the electric motor may be designed in order to reduce the torque fluctuation, for example, an auxiliary slot or non-uniform air gaps may be configured on the stator.

Figure 7:
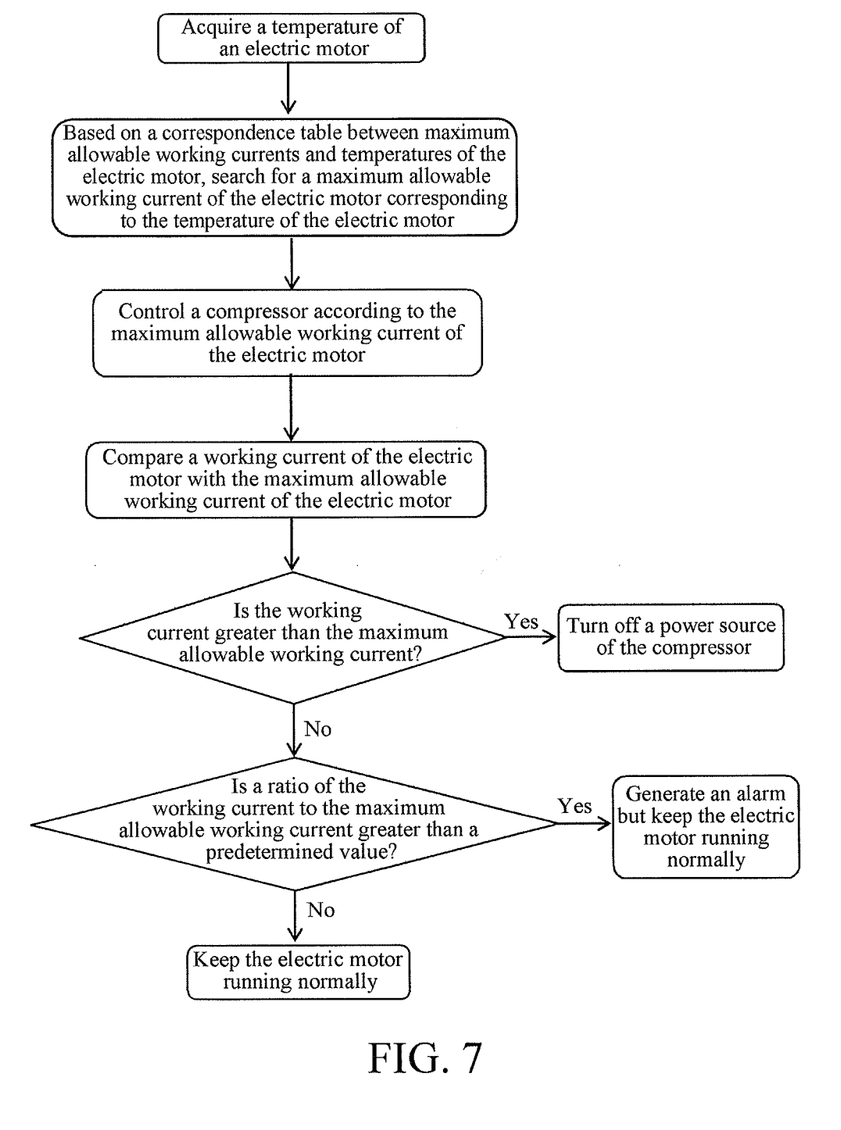
FIG. 7 is a flowchart of a method for controlling an electric motor of a compressor according to an embodiment of the present invention.

FIG. 7 is a flowchart of a method for controlling an electric motor of a compressor according to an embodiment of the present invention. The method will be described hereinafter with reference to FIG. 7

A temperature of the electric motor is obtained. The temperature of the electric motor is determined according to at least one of a winding temperature, a rotor temperature and an ambient temperature of the electric motor. For example, a temperature of the low-pressure chamber in the compressor may be detected and used or a temperature of the electric motor may be detected and used. According to a relationship table between maximum allowable working currents and temperatures of the electric motor, a maximum allowable working current of the electric motor corresponding to the temperature of the electric motor may be found; and the electric motor may be controlled according to the maximum allowable working current of the electric motor found.

A working current of the electric motor under the temperature of the electric motor obtained is compared with the maximum allowable working current of the electric motor so as to determine whether the working current of the electric motor is greater than the maximum allowable working current. If the working current of the electric motor is greater than the maximum allowable working current, a power supply of the compressor is turned off and the electric motor is stopped. If the working current of the electric motor is not greater than the maximum allowable working current, it is determined whether a ratio of the working current to the maximum allowable working current is greater than a predetermined value (such as 80-90% or 90%). If the ratio of the working current to the maximum allowable working current is greater than the predetermined value, an alarm is generated but the electric motor is kept running normally. If the ratio of the working current to the maximum allowable working current is not greater than the predetermined value, the electric motor is kept running normally. The predetermined value may be selected according to a specific condition and is not limited to any specific numerical value.

In other words, controlling of the electric motor may include: when the working current of the electric motor is lower than a specified threshold, keeping the electric motor running normally; when the working current of the electric motor is greater than the specified threshold and lower than the maximum allowable working current, generating an alarm but keeping the electric motor running normally; and when the working current of the electric motor is greater than the maximum allowable working current, stopping the electric motor. The temperature of the electric motor may be determined according to at least one of the winding temperature, the rotor temperature, and the ambient temperature of the electric motor.

A method for controlling the compressor includes: acquiring a temperature of an electric motor in the compressor; searching for a maximum allowable working current of the electric motor corresponding to the temperature of the electric motor according to a relationship table between maximum allowable working currents and temperatures of the electric motor; and controlling the compressor according to the maximum allowable working current of the electric motor. The controlling the compressor may include: when a working current of the electric motor is lower than a specified threshold, keeping the electric motor running normally, thereby keeping the compressor running normally; when the working current of the electric motor is greater than the specified threshold and lower than the maximum allowable working current, generating an alarm but keeping the electric motor running normally, thereby keeping the compressor running normally; and when the working current of the electric motor is greater than the maximum allowable working current, stopping the electric motor, thereby stopping the compressor. The specified threshold may be 90% of the maximum allowable working current. The temperature of the electric motor may be determined according to at least one of a winding temperature, a rotor temperature and an ambient temperature of the electric motor.

The method according to an embodiment of the present invention may further include: heating a ferrite magnet. According to an implementation manner of the present invention, any suitable heating manner may be used, for example, resistance heating or chemical heating.

According to an exemplary embodiment of the present invention, a heating current is applied to windings of a stator in order to generate an eddy current in the heating element so that the heating element can generate heat. For example, a pulse current or a sine current is applied to the windings of the stator in order to generate an eddy current in the heating element so as to generate heat.

Exemplarily, during an operation period, the windings of the stator in the electric motor generate an alternating magnetic field so that the heating element generates heat used for heating the ferrite magnet. In other words, the alternating magnetic field generated by the windings of the stator in the electric motor during normal operation enables the heating element to generate heat used for heating the ferrite magnet. Before the electric motor is started or when the electric motor is started or is running, a pulse current, or a pulse current component or high-frequency sine current component (that is, a current applied to the windings of the stator of the electric motor includes a pulse current component or a high-frequency sine current component) is applied to the windings of the stator in the electric motor, in order to generate a pulsating magnetic field or a high-frequency rotating magnetic field which generates an eddy current in the heating element to generate heat. Preferably, the pulse current, the pulse current component or the high-frequency sine current component applied to the windings of the stator makes a magnetic axis of the magnetic field generated by the stator substantially coincide with a magnetic axis of the rotor.

According to an embodiment of the present invention, for example, a ferrite permanent magnet synchronous motor is used in the variable-speed compressor, and in this way, costs of the variable-speed compressor are significantly reduced and the performance thereof is basically the same as a compressor using a rare-earth permanent magnet synchronous motor. Moreover, by controlling an input current of the electric motor or the compressor, the ferrite magnet in the electric motor is protected from irreversible demagnetization at a low temperature, thereby improving the reliability of the compressor.

Besides, embodiments of the present invention are applicable to any electric motor having a permanent magnet formed by a ferrite material, and any compressor having such electric motor. The electric motor may be disposed in a low-pressure chamber of the compressor or any low-temperature environment.

Although some embodiments of the general inventive concept have been shown and illustrated, persons of ordinary skill in the art shall understand that changes may be made to these embodiments without departing from the principle and spirit of the general inventive concept, and the scope of the present invention is defined by the claims and their equivalents.

What is claimed is:

1. An electric motor, comprising:
    a stator;
    single-phase or multiphase windings disposed on the stator; and
    a rotor, wherein the rotor comprises a rotor core made up of rotor laminations, a permanent magnet slot formed in the rotor core, and a permanent magnet disposed in the permanent magnet slot, and wherein at least part of the permanent magnet is ferrite;
    a heating element located in the permanent magnet slot and disposed on a surface of or close to the ferrite of the rotor and operable for heating the ferrite.

2. The electric motor according to claim 1, wherein the electric motor is a built-in permanent magnet motor.

3. The electric motor according to claim 1, wherein the heating element is made of an electric conductive material.

4. The electric motor according to claim 3, wherein the heating element comprises at least one of a silicon steel sheet, a magnetic iron sheet and a magnetic iron block.

5. The electric motor according to claim 1, wherein the windings of the stator in the electric motor are operable for generating an alternating magnetic field to enable the heating element to generate heat, and the heat generated by the heating element is operable for heating the ferrite.

6. The electric motor according to claim 5, wherein
    the electric motor is connected to a drive; and
    the drive is operable for applying a pulse current or a sine current to the windings of the stator to enable the windings of the stator to generate the alternating magnetic field, wherein the alternating magnetic field enables the heating element to generate an eddy current and to generate the heat.

7. The electric motor according to claim 5, wherein
    the electric motor is connected to a drive;
    before the electric motor is started, the windings of the stator are operable for generating a pulsating magnetic field under the effect of a pulse current applied by the drive, wherein the pulsating magnetic field generates an eddy current in the heating element so as to generate the heat; and/or,
    when the electric motor is started or is running, the windings of the stator are operable for generating a pulsating magnetic field or a high-frequency rotating magnetic field under the effect of a pulse current component or high-frequency sine current component applied by the drive, wherein the pulsating magnetic field or the high-frequency rotating magnetic field generates an eddy current in the heating element so as to generate the heat.

8. The electric motor according to claim 7, wherein the pulse current or the pulse current component or the high-frequency sine current component applied to the windings of the stator makes a magnetic axis of the magnetic field generated by the windings of the stator substantially coincide with a magnetic axis of the rotor.

9. The electric motor according to claim 1, wherein the ferrite has an average thickness greater than or equal to 4 mm, and less than or equal to 6 mm.

10. The electric motor according to claim 1, wherein in an axial direction of the rotor, a rotor core formed by rotor laminations has a same length as a stator core formed by stator laminations, or the rotor core formed by the rotor laminations is longer than the stator core formed by the stator laminations.

11. The electric motor according to claim 10, wherein in the axial direction of the rotor, a rotor core formed by rotor laminations is 6 mm to 16 mm longer than a stator core formed by stator laminations.

12. The electric motor according to claim 1, wherein
    the stator comprises: a stator core; multiple stator teeth extending inward along a radial direction of the stator; and stator slots distributed between the stator teeth;
    the windings are wound on the stator teeth and operable for generating a rotating magnetic field; and
    the rotor is rotatably disposed in the stator and is at a distance from the stator, the permanent magnet is disposed on the rotor to form a rotor pole.

13. The electric motor according to claim 1, wherein the heating element is operable for generating an eddy current under affection of a heating current applied to the windings of the stator in the electric motor, and is operable for generating the heat for heating the ferrite.

14. A compressor, comprising:
    a shell;
    a high-pressure chamber and a low-pressure chamber within the shell; and
    an electric motor according to claim 1 disposed in the low-pressure chamber.

15. A method for controlling an electric motor according to claim 1 or a compressor comprising the electric motor according to claim 1, comprising:
    obtaining a temperature of the electric motor;
    searching for a maximum allowable working current of the electric motor corresponding to the temperature of the electric motor according to a relationship table between maximum allowable working currents and temperatures of the electric motor; and
    controlling the electric motor or the compressor according to the maximum allowable working current of the electric motor.

16. The method according to claim 15, wherein the controlling the electric motor or the compressor comprises:
    when a working current of the electric motor is lower than a specified threshold, keeping the electric motor running normally;
    when the working current of the electric motor is greater than the specified threshold and lower than the maximum allowable working current, generating an alarm but keeping the electric motor running normally; and
    when the working current of the electric motor is greater than the maximum allowable working current, stopping the electric motor.

17. The method according to claim 16, wherein the specified threshold is 90% of the maximum allowable working current.

18. The method according to claim 15, wherein the temperature of the electric motor is determined according to at least one of a winding temperature, a rotor temperature and an ambient temperature of the electric motor.

19. The method according to claim 15, further comprising: heating the ferrite of the rotor by the heating element.

20. The electric motor according to claim 1, further comprising a second heating element disposed on the surface of or close to the ferrite of the rotor and operable for heating the ferrite.

21. The electric motor according to claim 1, wherein the heating element is disposed on an upper surface of the ferrite of the rotor or a lower surface of the ferrite of the rotor.

22. The electric motor according to claim 20, wherein the heating element and the second heating element are respectively disposed on an upper surface of the ferrite of the rotor and a lower surface of the ferrite of the rotor, or the heating element and the second heating element are respectively disposed on two side surfaces of the ferrite of the rotor.

* * * * *